(12) United States Patent
Wyatt

(10) Patent No.: US 7,266,113 B2
(45) Date of Patent: Sep. 4, 2007

(54) METHOD AND SYSTEM FOR DETERMINING NETWORK CAPACITY TO IMPLEMENT VOICE OVER IP COMMUNICATIONS

(75) Inventor: Joshua David Wyatt, Raleigh, NC (US)

(73) Assignee: HCS Systems, Inc., Garner, NC (US)

( * ) Notice: Subject to any disclaimer, the term of this patent is extended or adjusted under 35 U.S.C. 154(b) by 1142 days.

(21) Appl. No.: 10/262,231

(22) Filed: Oct. 1, 2002

(65) Prior Publication Data

US 2004/0062231 A1 Apr. 1, 2004

(51) Int. Cl.
*H04L 12/66* (2006.01)

(52) U.S. Cl. ...................... 370/352; 370/252

(58) Field of Classification Search ............... None
See application file for complete search history.

(56) References Cited

U.S. PATENT DOCUMENTS

| | | | |
|---|---|---|---|
| 4,680,784 A | 7/1987 | Lenhert et al. | |
| 5,384,823 A | 1/1995 | Brenski et al. | |
| 5,488,648 A | 1/1996 | Womble | |
| 5,621,670 A | 4/1997 | Maeda et al. | |
| 6,272,450 B1 | 8/2001 | Hill et al. | |
| 6,285,748 B1 | 9/2001 | Lewis | |
| 6,363,065 B1 | 3/2002 | Thornton et al. | |
| 6,442,264 B1 * | 8/2002 | Sutter | 379/142.07 |
| 6,467,089 B1 * | 10/2002 | Aust et al. | 725/13 |
| 6,850,525 B2 * | 2/2005 | Mitsumori et al. | 370/395.52 |
| 7,039,041 B2 * | 5/2006 | Robohm et al. | 370/352 |
| 7,106,723 B2 * | 9/2006 | Rabenko | 370/352 |
| 7,139,374 B1 * | 11/2006 | Scott et al. | 379/142.1 |
| 2002/0016708 A1 | 2/2002 | Houh | |

FOREIGN PATENT DOCUMENTS

GB 2169476 A 7/1986

OTHER PUBLICATIONS

"Network Problem Solver," Ben Smith, *Byte*. vol. 19, No. 11, pp. 247-250, Nov. 1994 (abstract only).
"Testing network performance to the limit," P. Hedner, *Telecom Report*, vol. 20, No. 4, pp. 54-55 1997 (abstract only).
"Practical realization of load tests within the framework of a system test for the digital mobile radio system DMCS 900," A. Weber, *ITG-Fachberichte*, No. 124, pp. 433-444, 1994 (abstract only).

(Continued)

*Primary Examiner*—Phirin Sam
(74) *Attorney, Agent, or Firm*—Ward & Smith, P.A.; A. Jose Cortine

(57) ABSTRACT

The method and system allows for predicting the capacity of a data network to have voice over IP communications implemented thereon. Information corresponding to network data transmission traffic is collected. Information corresponding to telephone call traffic on the PSTN for an organization is also collected. A determination is made about what load the telephone call traffic would impose on the network if implemented as voice over IP traffic. This is compared to the network capacity and it is determined from this comparison whether the network is capable of having conventional legacy telephone traffic implemented thereon as voice over IP.

15 Claims, 9 Drawing Sheets

OTHER PUBLICATIONS

"GENISM. An interactive discrete event simulator for telephone networks," Mathis, et al, *Simulation Series*, vol. 20, No. 4, pp. 253-257, 1989 (abstract only).

"Advances in Telecommunications Networks—Contributions of the International Teletraffic Congress," P.J. Kuehn, *Performance of the Computer-Communication Systems, Proceedings of the IFIP WG 7.3/TC6 Second International Symposium*, pp. 527-540, 1984 (abstract only).

"Admission control schemes for bursty multimedia traffic," Lee, et al, *Proceedings IEEE INFOCOM 2001. Conference on Computer Communications. Twentieth Annual Joint Conference of the IEEE Computer and Communications Society*, 2001 (abstract only).

"A hybrid ATM connection admission control scheme based on on-line measurements and user traffic decsriptiors," Habibi, et al, *Proceedings IEEE International Conference on Networks 2000 (ICON 2000), Networking Trends and Challenges in the New Millennium*, 2000 (abstract only).

"IP telephony's delay—The business mainstream is hesitant to shift analog voice to IP networks, despite promised efficiency", J.C. Luh, *Internet World*, vol. 5, No. 35, p. 44, Dec. 15, 1999 (abstract only).

"The Five Key Steps to Selling IP Telephony—It takes good communication to switch companies over to VoIP," M. Walker, *VARbusiness*, vol. 20, Nov. 26, 2001.

"NetReality: WiseWan on the Way," M. Semilof, *Computer Reseller News*, No. 839, p. 73, 1999.

"Opinions that emerged from last weeks ITU policy forum on IP," *Communications Daily*, Mar. 15, 2001.

* cited by examiner

METHOD AND SYSTEM FOR DETERMINING NETWORK CAPACITY TO IMPLEMENT VOICE OVER IP COMMUNICATIONS

BACKGROUND OF THE INVENTION

1. Field of the Invention

The invention relates to a method and system of predicting the capacity of a data network to have voice over IP communications implemented thereon. More specifically, the invention relates to such a method and system to allow conventional telephone call traffic conducted on the PSTN, and possibly using a PBX in an organization, to be migrated to a data network as voice over IP, thereby avoiding tolls and providing other advantages.

2. Description of the Background

As data network technology evolves, including capacity of the networks, it becomes possible to use such networks as an alternative to legacy phone systems so that telephone calls can be placed in what is known as voice over IP communication. However, depending on the volume of telephone calls, it is possible to discover that an organization has migrated a legacy phone system to its network in a voice over IP environment, and that the network does not have sufficient capacity to handle the existing data operations along with the telephone call volume that has been migrated onto the network. This can result in disastrous consequences.

For most organizations, it is desirable to move from the public telephone network to a voice over IP environment in part because of the desirability of avoiding tolls. Currently, the decision to move the telephone system to data networks involves an estimate without certainty of what impact moving the telephone system over to the network would have, or at best a guess. As a result, it is possible that all of a sudden the data network can be populated with more data than it can handle.

Nonetheless, notwithstanding these potential problems, there are a number of motivations, not just toll avoidance, for moving to voice over IP communication. One motivation converges the manageability of the network so that only one, instead of two, networks need be maintained. Cost is a driving factor, and in order to be successful, an organization needs to be as knowledgeable as possible about the environment, and what the voice traffic is going to be on the network before deploying to voice over IP.

In accordance with the invention, the problems of the prior art are avoided, particularly when implemented in companies or organizations that include a legacy analog phone system, which includes typically a PBX, and which also have an existing data network, to which the telephone system from the PBX can be migrated to voice over IP.

As may be readily apparent, by migrating to the company's network and connecting directly to the public switch telephone network (PSTN), a number of advantages result.

SUMMARY OF THE INVENTION

In one aspect the invention relates to a method of predicting the capacity of a data network to have voice over IP communications implemented thereon. Information corresponding to network data transmission traffic on the network is collected. Similarly, information corresponding to telephone call traffic on the PSTN is also collected. From this information, a determination is made as to what load the telephone call traffic would impose upon the organization's network as voice over IP traffic. From that information, a determination is then made about whether the organization's network is capable of having the call traffic implemented on the network by comparing the network total capacity to the combined traffic load to be imposed.

Typically the information corresponding to network data transmission traffic is collected from an appliance connected to a router, for polling the router for current network utilization. The telephone call traffic information may be obtained from a PBX at the network user's site or other source, reflecting call volume.

In another aspect, there is described a system for determining the capacity of a data network. The system includes a module for collecting and assembling information corresponding to network data transmission traffic as well as a module for collecting and assembling information corresponding to telephone call traffic for the organization. A third module serves to assemble the information about network data transmission traffic and telephone call traffic, for determining the total traffic load on the network if the telephone call traffic is implemented as voice over IP traffic.

Yet still further, there is provided a database for storing the assembled information about the traffic. A reporting module serves to report what the total load on the network would be if telephone calling was implemented on the network as voice over IP.

In a yet still more specific aspect, the system is implemented on a personal computer connected to the network.

BRIEF DESCRIPTION OF THE DRAWINGS

Having thus generally described the invention, the same will become better understood from the following detailed description taken in conjunction with the appended drawings wherein.

DETAILED DISCUSSION OF THE INVENTION

Figure 1:
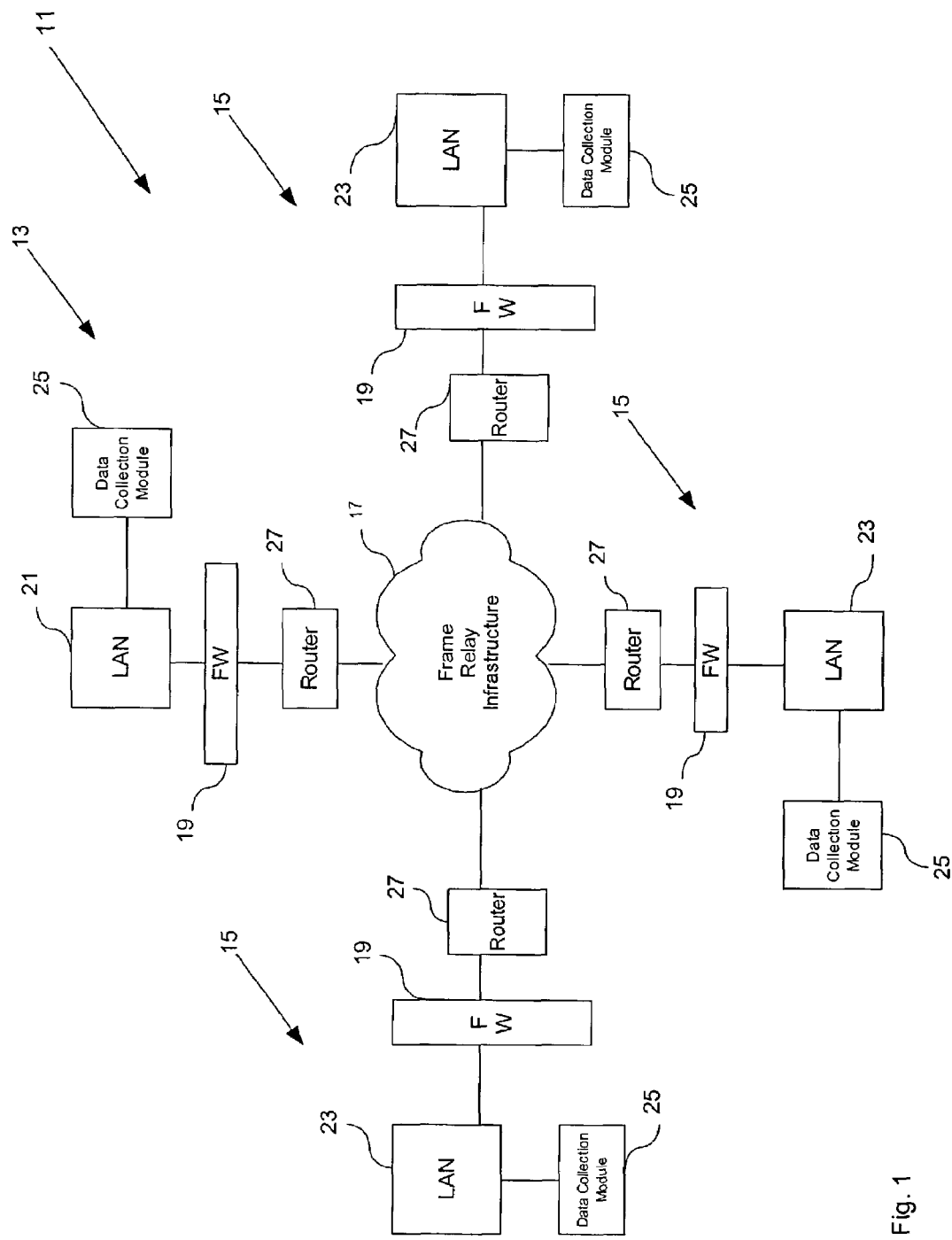
FIG. 1 is a block diagram illustrating generally how the system and method described herein can be implemented on a plurality of local area networks interconnected through a frame relay infrastructure such as the Internet where one of the local area networks is the headquarters, allowing for collection and assembling of desired information.

FIG. 1 is a block diagram representation of a network arrangement 11 which includes a headquarters site 13 and network operation center and several network sites 15 interconnected through a frame relay infrastructure 17 such as the Internet.

Typically such network operations will have data and communications routed to users within the networks 21 or 23 which constitute local area networks at different sites, through a router 27 which is conventional and well known to those of ordinary skill in the art. The local area networks 21 or 23 are protected or separated from the frame relay infrastructure 17 such as the Internet through means of a conventional firewall 19 with a connection through the firewall then being made to the networks 21 or 23.

In accordance with the system and method described herein, data collection modules or appliances 25 are connected to the local area network 21 or 23 to periodically poll the routers 27 and obtain information about network traffic at each of the local area networks 21 or 23 for the purpose of determining total network load and predicting whether it is possible to move conventional telephone traffic on the PSTN into network traffic as voice over IP telephone communications.

While the data collection modules 25 have been depicted as connected externally to the local area network, it will be appreciated by those of ordinary skill in the art that the connection points can be at any point in the network where the data collection module can obtain relevant data about network traffic. As will also be apparent to those of ordinary skill in the art, the data collection module can be made up of an Intel-based personal computer running a Linux or other operating system, and programmed for detecting and monitoring data flow in a manner which will be readily apparent to those of ordinary skill in the art from a reading hereof.

Figure 2:
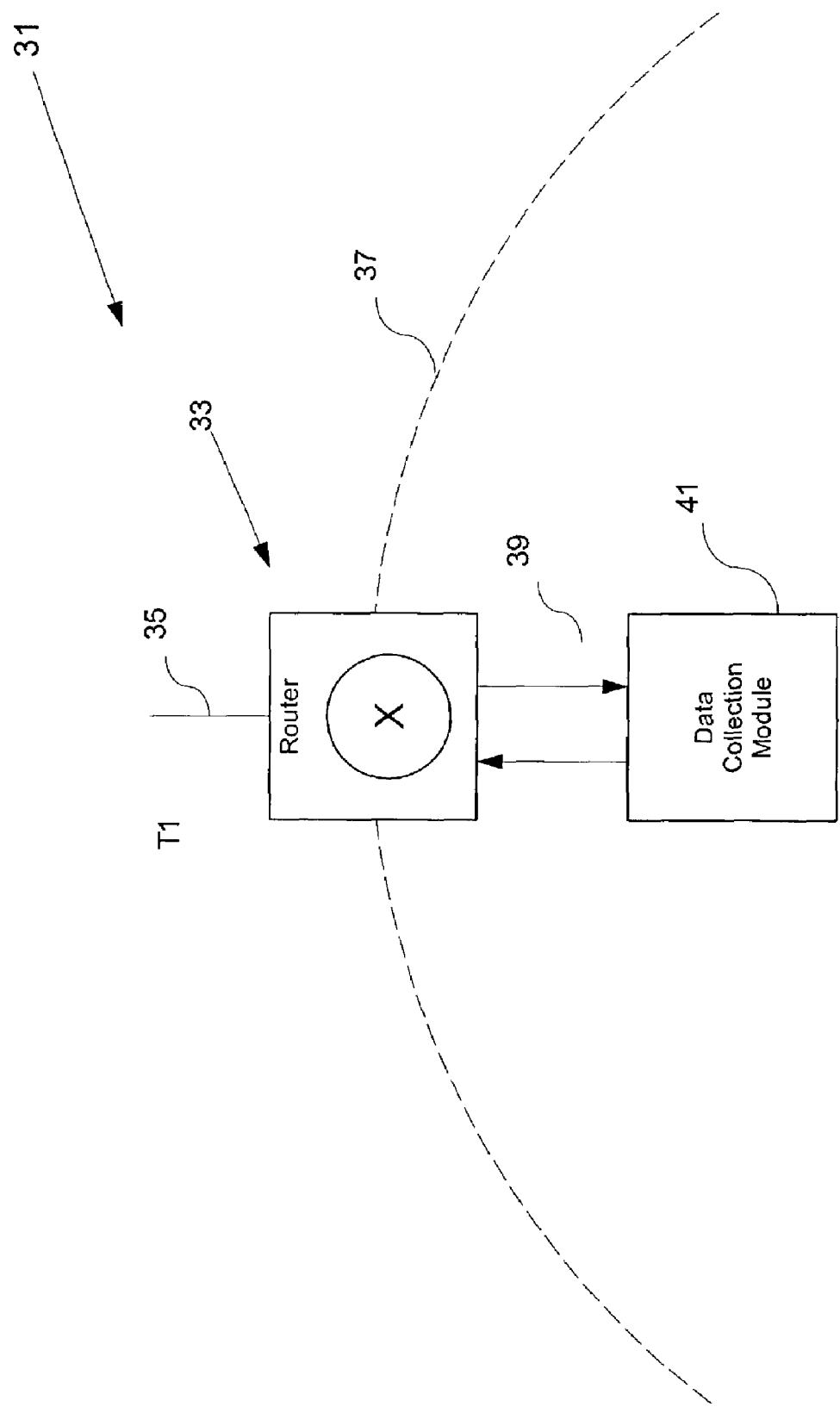
FIG. 2 is a block diagram illustrating how a data collection module in accordance with the system and method herein interacts with a router at a network boundary.

FIG. 2 illustrates a typical network connection 31 showing a network boundary 37 with a router 33 at the network boundary connected through a connection 35, for example a T-1 line to the frame relay infrastructure 17 previously described. Connections 39 are established between data collection modules 41 which periodically poll the router for current data network utilization statistics to determine how much data is being operated on the network at any particular time. The data collection module 41 is programmed to be a simple network management protocol data collector (SNMP). Although the SNMP protocol is preferred, the invention is not limited to use of that protocol and any other protocol capable of polling routers and obtaining network traffic data can be deployed as part of the invention.

In this context, the data collection module 41 polls the router for network statistics, more specifically, byte counts and packet counts, so that the capacity and utilization for the network can be determined. Similarly, while FIG. 2 depicts the router being connected through a T-1 line 35, any other type of serial link such as ether net can be deployed in the network systems being monitored.

In conducting the method and employing the system described herein, it is important to realize that network utilization must be monitored over a predetermined period of time to be able to obtain a true picture of network utilization. For example, a relevant period of time may involve a seven-day period.

Figure 3:
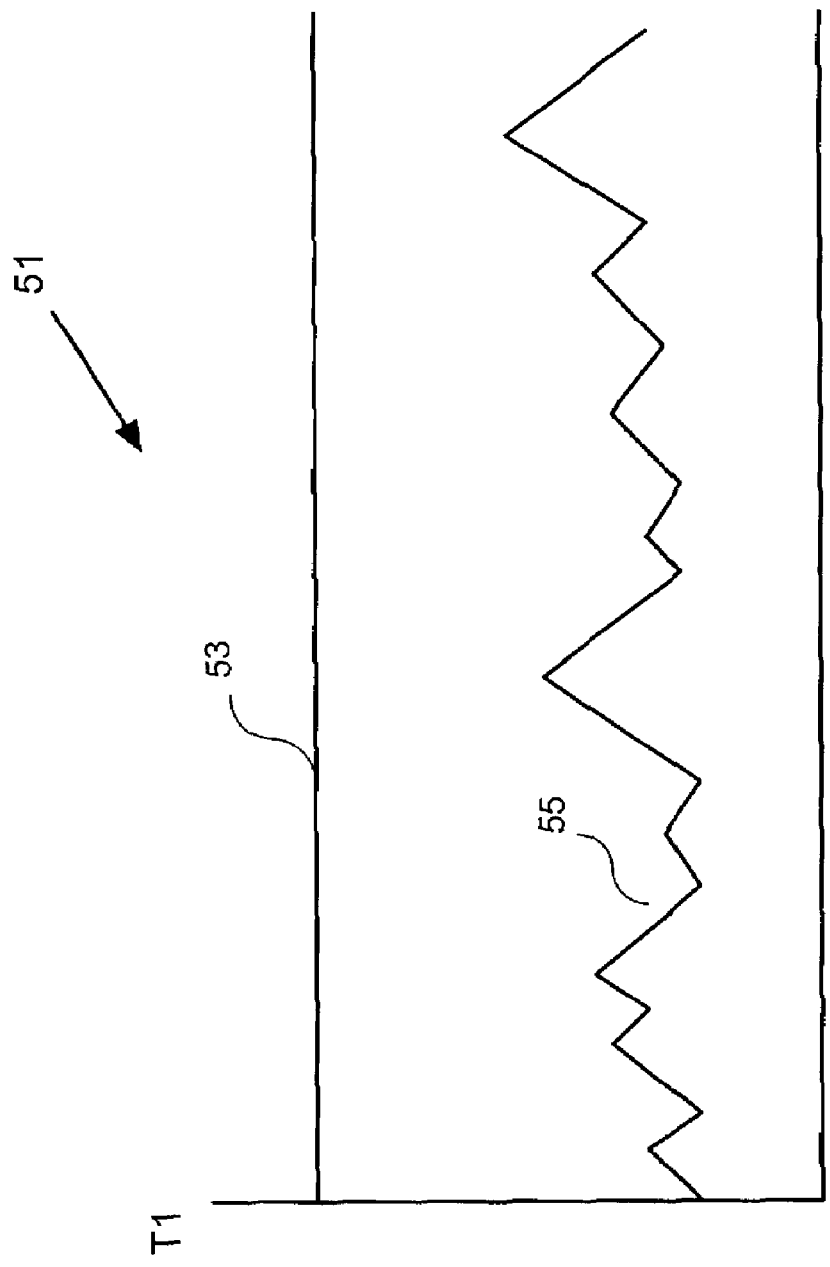
FIG. 3 is a graph illustrating how, by collecting the information, a view can be obtained about what the actual traffic on the network would be after conversion to voice over IP as compared to total network capacity.

Thus, as a result of collection of information, the resultant information may look like the graph 51 shown in FIG. 3 which shows a line 53 for total network capacity and a plot 55 showing typical network utilization. Such a graph then allows accurate prediction of whether the network is capable of having conventional legacy telephone calls transitioned onto the network as voice over IP communications.

Figure 5:
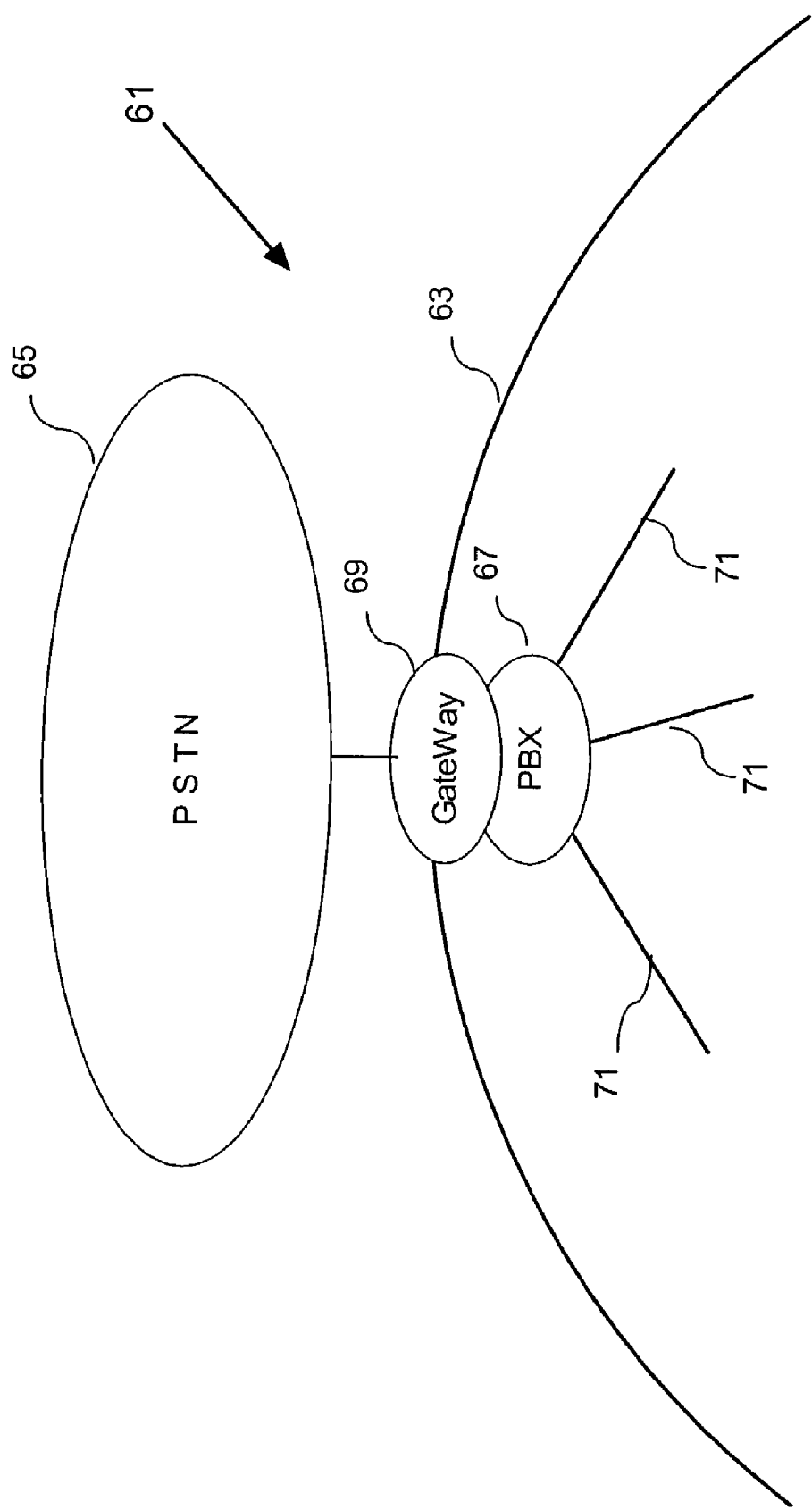
FIG. 5 is a diagram illustrating a typical organization PBX phone system connected through a gateway to the public service telephone network.

FIG. 5 illustrates a conventional telephone system 61 as presently deployed in many organizations. The organization's boundary 63 for the legacy telephone system includes a conventional gateway 69 which connects to the public service telephone network (PSTN) 65. The gateway 69 is typically connected to a PBX 67 which is conventional in nature and which connects through connections 71 to the various extensions in the organization's telephone system.

In determining whether the legacy telephone system can be transitioned to voice over IP, it is important to obtain data, for example, from PBX 67. Such a PBX 67 maintains call detail records which show telephone calls made through it. Thus, at the gateway PBX an organization would have the general phone number for the organization, and then after the first three digits, the internally-assigned extension. Thus, if a member of the organization's phone is used to call internally or to call someone on the outside through the PSTN 65, there is a record of phone usage. These records are known conventionally as Call Detail Records, and well known to those of ordinary skill in the art.

Figure 6:
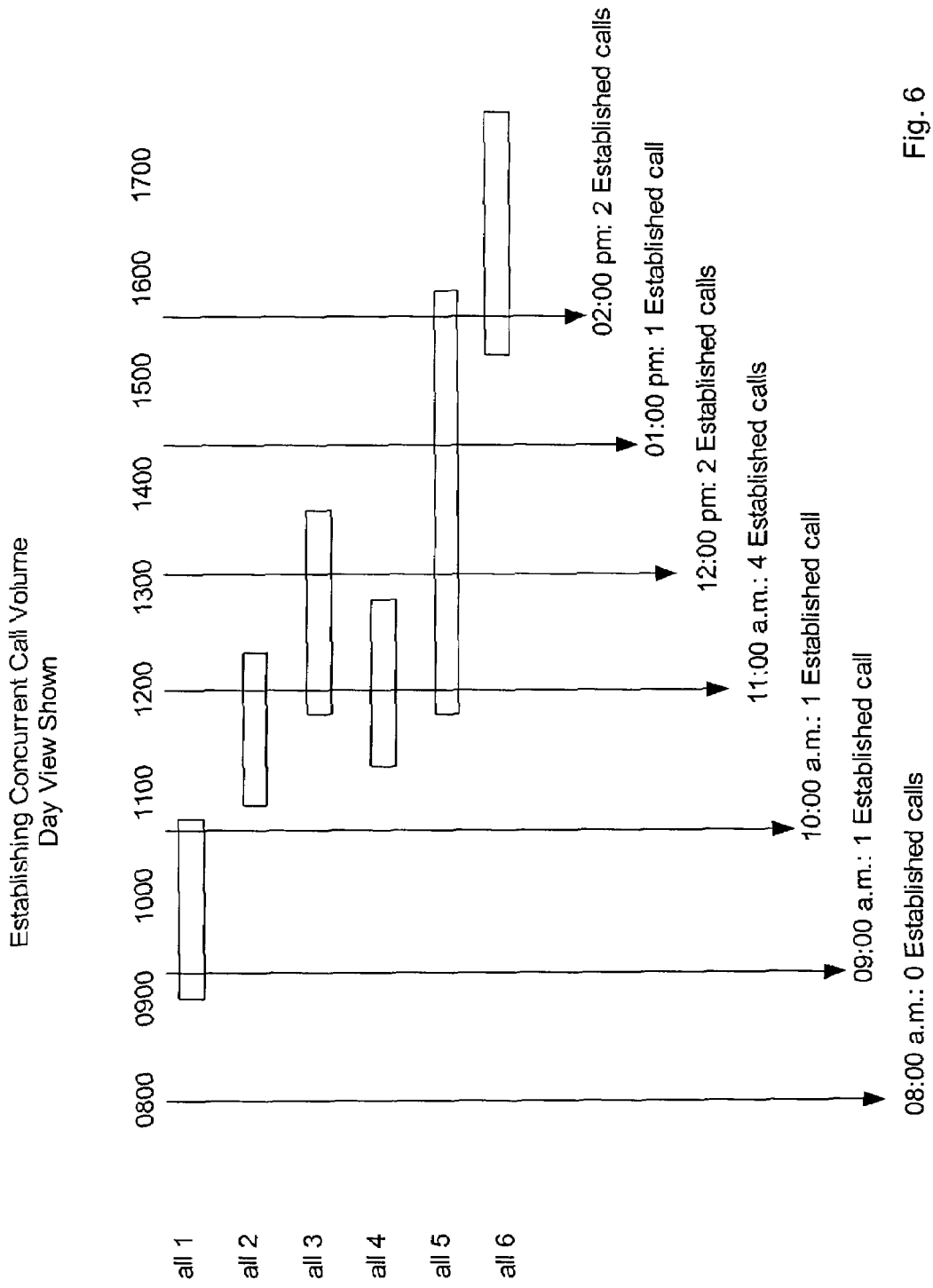
FIG. 6 is a chart illustrating how concurrent call volume data is calculated for telephone traffic which is to be implemented as voice over IP communications on a network.

While the data for call information may be obtained from a PBX, because that is the most common way, alternatively, data could be obtained from a billing record in the form of raw traffic statistics or raw call data statistics. The most important pieces of data to be obtained from the call records are the extension of the telephones that made the call, and the time it started, as well as the time it ended or the duration. FIG. 6 illustrates how concurrent call volume for a particular date can be determined and shows how the count of established calls is tracked over time to obtain an accurate picture of call volume.

Figure 7:
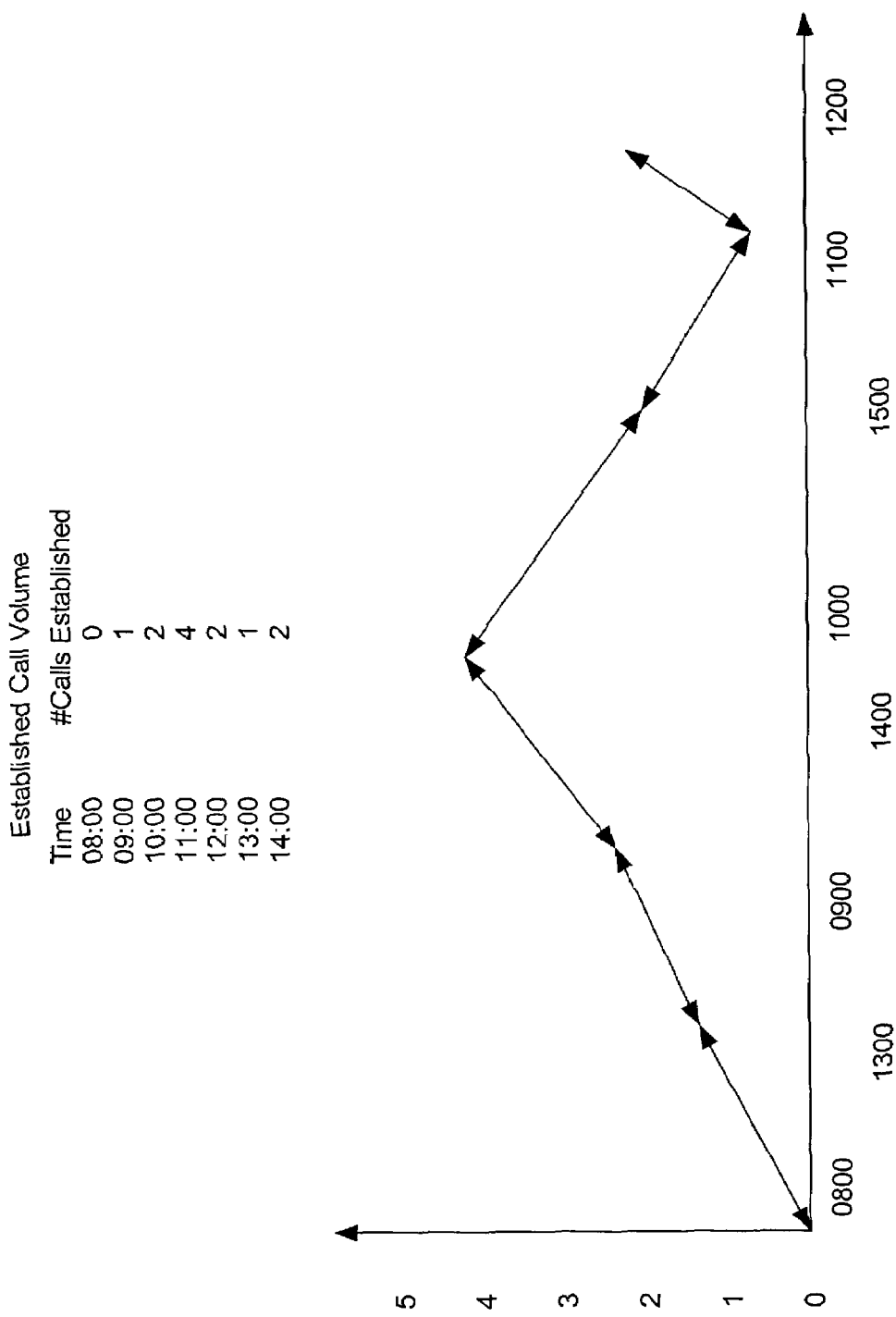
FIG. 7 is a graph illustrating in an alternative form a typical load imposed based on call volume.

This information can then be plotted as shown in FIG. 7 in a graph over time which graphically represents the established call volume.

Figure 8:
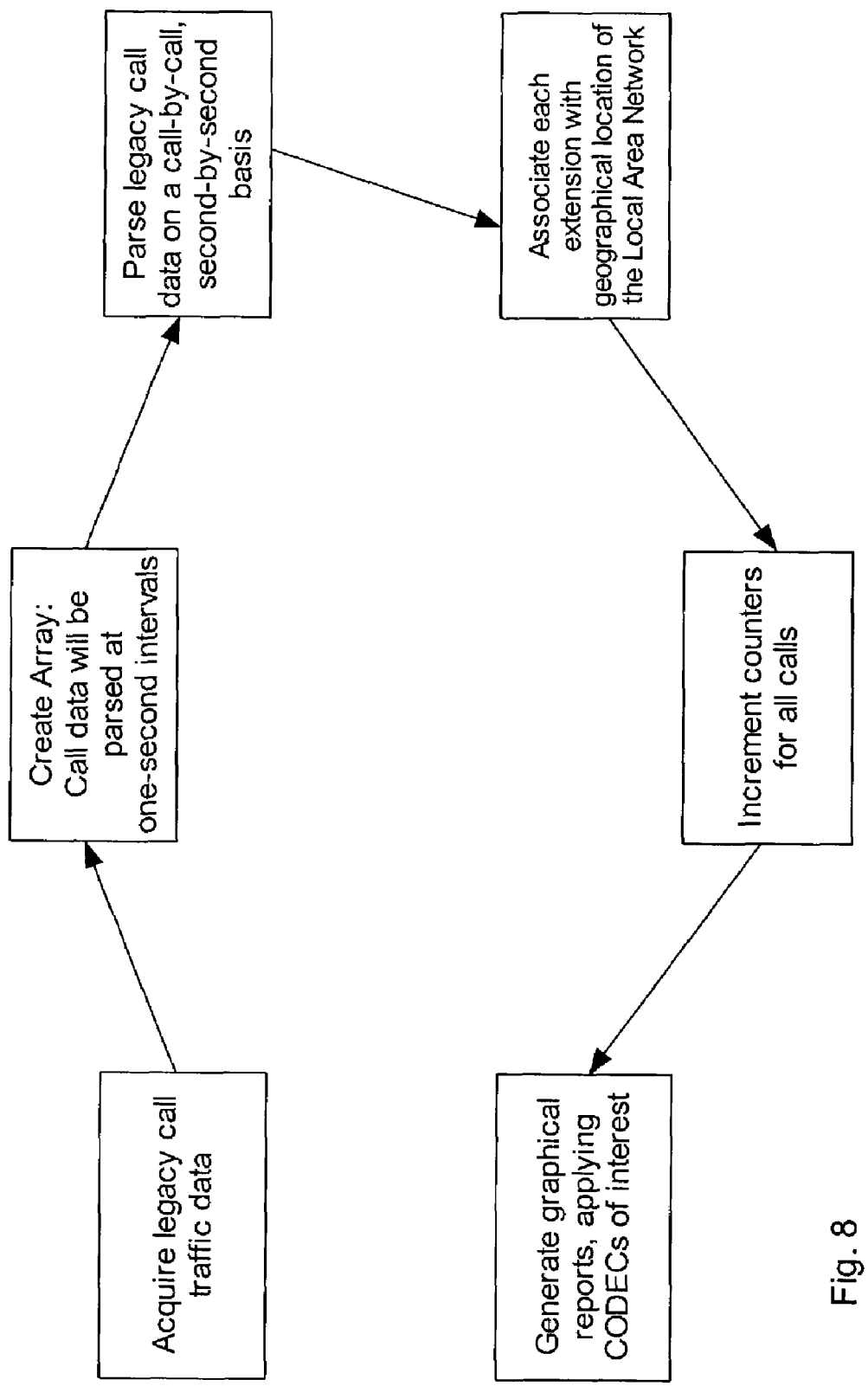
FIG. 8 is a flow diagram illustrating how legacy call data is acquired and converted into useful data to determine its impact on a network if converted to voice over IP.

FIG. 8 illustrates a flow diagram of how legacy call traffic data is acquired. At a first step, the legacy call traffic data is acquired, for example, from a PBX either in the form of a report that is input into the data collection modules 25 shown in FIG. 1. An array is created wherein the call data is parsed at one-second intervals, as a typical time interval. The legacy call data is then parsed on a call-by-call and second-by-second basis. Thereafter, each extension is associated with the geographical location of the local area network, and a counter at the data collection module 25 is incremented for all calls.

While the total call volume is interesting, from an analysis perspective it is useless unless converted into useful data representing what that call volume would mean in the context of network utilization.

Figure 9:
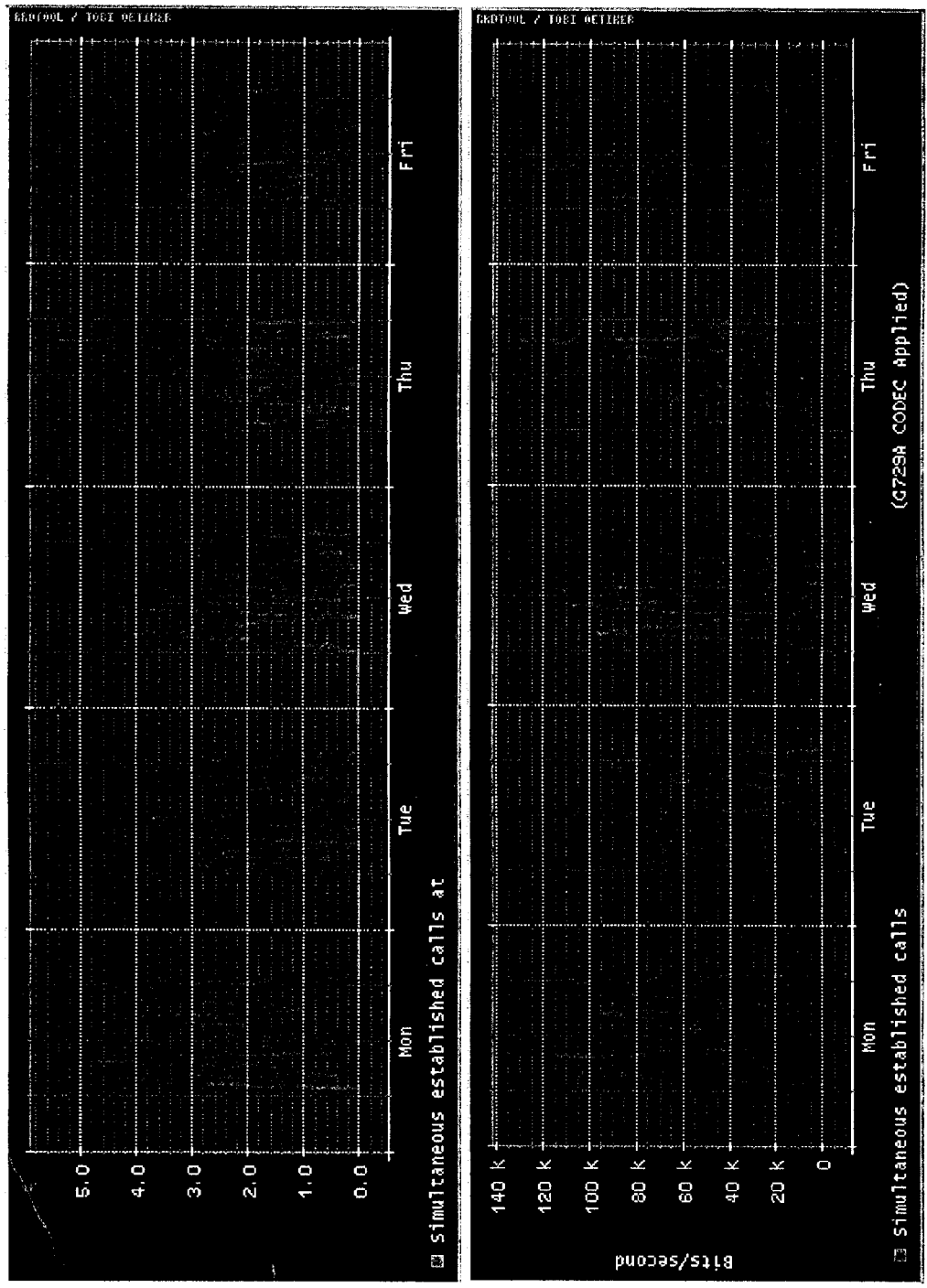
FIG. 9 illustrates two actual graphs showing simultaneous established calls at an organization's legacy system and at the bottom as converted to illustrate typical impact on a data network as bits per second after a suitable CODEC has been applied to the data.

This is shown in greater detail in FIG. 9 where a top graph illustrates simultaneous established calls which when converted with an appropriate CODEC, which are readily available and well known to those of ordinary skill in the art, translates into network traffic load if implemented as voice over IP in bits/seconds as shown in the lower graph of FIG. 9.

Figure 4:
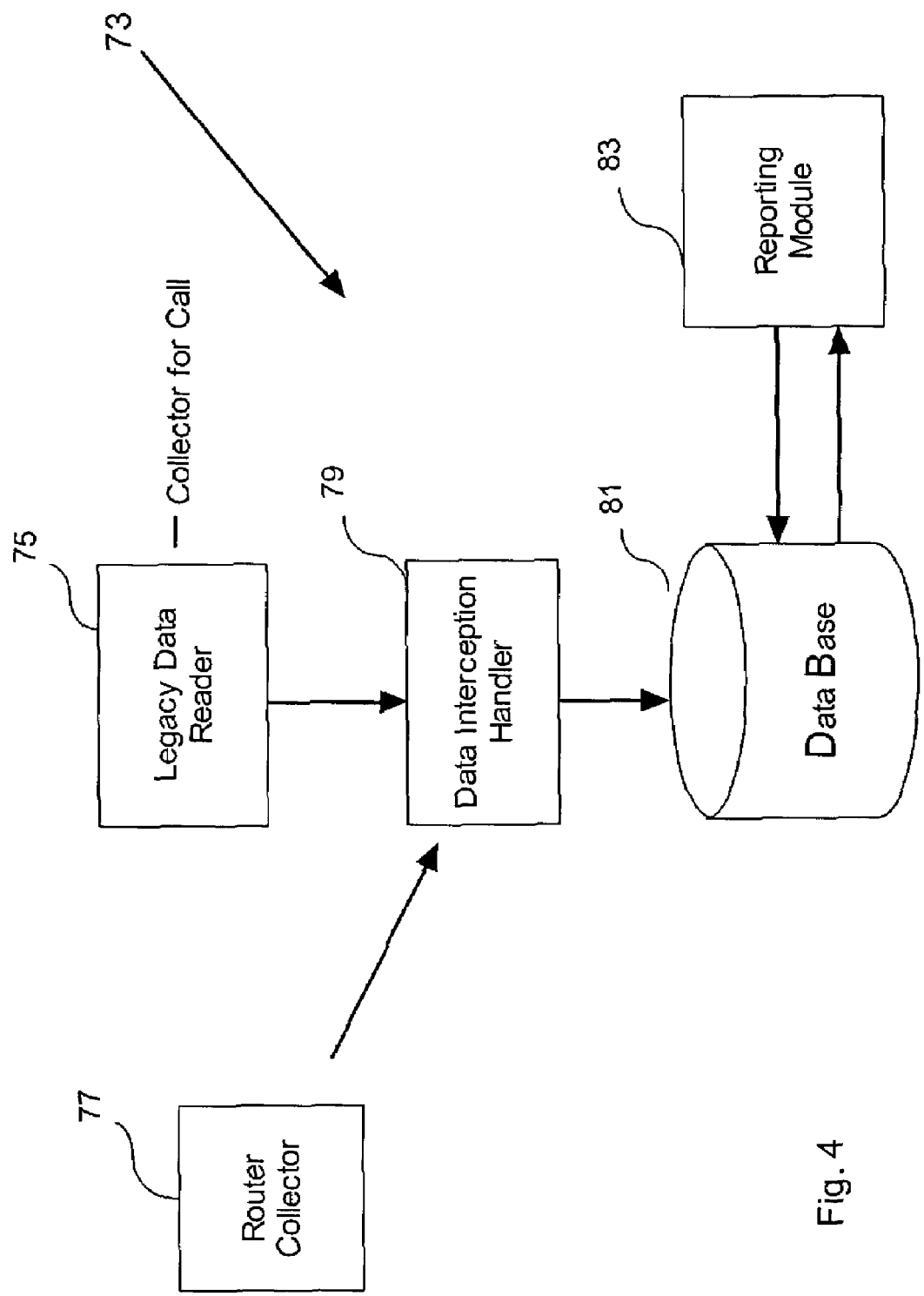
FIG. 4 is a more detailed block diagram illustrating the various modules of the system and method, and how they interact to collect data.

Returning now to a discussion of the data collection module, this is shown in greater detail as the various modules 73 shown in FIG. 4. As connected within a network, the system 73 includes a legacy data reader 75 which can be either a direct connection to a PBX or can be, for example, a manual input of legacy call data which is transmitted to data interception handler 79. Similarly, the data interception handler 79 may be connected to a router collector 77, and can incorporate data collection modules to obtain data about network data traffic through polling of the router collector 77.

At the data interception handler 79, the data from the legacy data reader 75 concerning legacy telephone traffic can then be stored on a database 81 which may be accessed by a reporting module 83 at either the headquarters site 13 or at either of the remote sites 23 and periodically transmitted and updated at the headquarters site 13 to obtain an accurate view of what the traffic impact would be if legacy telephone data was converted at one or all of the network sites into voice over IP communications being handled by the network. The reporting module 83 can then convert the data into useful data representative of what the call traffic impact would be on the data network as voice over IP through the use of an appropriate CODEC.

As may be appreciated, the system, as a result of a using a modular design, allows quick adaptation to infrastructure changes and is highly scalable. Data is placed in the queue in time-series order. The queue is then processed in time-series order assuring that the data arrives in the proper sequence from the reporting modules 83 at the headquarters site 13. The headquarters site constitutes a higher tier appliance and as the queue is processed, each data point is formed into a carefully checksum-armored URL, which is then sent to a specialized web server at the headquarters site 13 via HTTP. The data is then placed into the database at the headquarters site 13 on a server by way of the data interception handler 79 corresponding to the headquarters site 13.

More specifically, handling of the data is a two-stage process. Data is initially collected and provided to the data interception handler. The data interception handler changes the representation of the metric into the uniform self-described format (USDF), and places the data into a queue to be transmitted to the higher tier appliance or data collection module and system at the headquarters site 13. At specified intervals, the queue is processed and the data is delivered to the headquarters site 13.

Any kind of metric data can be replicated using this method, even previously replicated data, because the data interception handler converts it to the USDF after the initial collection.

In a preferred aspect, data is collected every two minutes and archived. For every 5 data points (10 minutes), the 5 data points are averaged and the result is placed in a separate and second archive. Thereafter, every 15 data points (30 minutes) are averaged and placed into a third archive. For each averaged data point, the minima and maxima of the time span averaged is also recorded. Each archive holds exactly the time span indicated and when the end of the archive is reached, data insertion "wraps around" back to the beginning of the archives so that the database never grows.

Having thus generally described the invention, the same will be better understood from the appended claims in which it is set forth in a non-limiting manner.

What is claimed is:

1. A method of predicting the capacity of a data network to have voice over IP communications implemented thereon, comprising:

collecting information corresponding to network data transmission traffic on an organization's network on which it is desired to implement voice over IP communication;

collecting information corresponding to telephone call traffic on the PSTN for said organization;

determining what load the telephone call traffic would impose on the organization's network if implemented on the network as voice over IP traffic from said collected telephone call information; and determining whether the organization's network is capable of having said call traffic implemented on the network by comparing the network's total capacity to the combined traffic load to be imposed on the network based on the collected information corresponding to network data transmission traffic combined with determined load the call traffic would impose if implemented as voice over IP on the network.

2. The method of claim 1, wherein said information corresponding to network data transmission traffic is collected from an appliance connected by a router connected to the network for polling the router for current network utilization.

3. The method of claim 1, wherein said information corresponding to telephone call traffic is obtained from a PBX at a user's site.

4. The method of claim 2, wherein said information corresponding to telephone call traffic is obtained from a PBX at a user's site.

5. The method of claim 2, wherein said router is polled with an SNMP collector.

6. The method of claim 2, wherein said appliance is a personal computer.

7. The method of claim 1, further comprising assembling said information corresponding to network data transmission traffic and telephone traffic in a database.

8. The method of claim 1, further comprising collecting said network traffic information and said telephone call traffic information for multiple local area networks interconnected through a frame relay network.

9. The method of claim 8, further comprising reporting the collected information from all the local area networks to one local area network comprising a headquarters site.

10. A system for determining the capacity of a data network to have voice over IP communications implemented thereon, comprising:

a module for collecting and assembling information corresponding to network data transmission traffic on an organization's network on which it is desired to implement voice over IP communications;

a module for collecting and assembling information corresponding to telephone call traffic on the PSTN for said organization;

a module for assembling said information about network data transmission traffic and telephone call traffic, and for determining the total traffic load on the network if said telephone call traffic is implemented as voice over IP traffic on the network; and a reporting module for reporting what the total load on the network would be if telephone calling was implemented on the network as voice over IP traffic.

11. The system of claim 10, further comprising a database for storing the assembled information about network data transmission traffic and telephone call traffic in implemented as voice over IP traffic.

12. The system of claim 10, wherein said module for assembling said information is connectable to a router, and is configured for polling the router to obtain network data transmission traffic information.

13. The system of claim 10, wherein the system is implemented on a personal computer connected to the network.

14. The system of claim 10, wherein said module for collecting and assembling information corresponding to telephone call traffic is configured for receiving data from a PBX at the user's site reflecting telephone call traffic.

15. The system of claim 14, further comprising means for connecting said telephone call traffic data to data representative of traffic flow on a data network as voice over IP traffic.

* * * * *